(12) United States Patent
Reissig (10) Patent No.: US 8,690,106 B1
(45) Date of Patent: Apr. 8, 2014

(54) EJECTOR DRIVEN FLOW CONTROL FOR REDUCING VELOCITY DEFICIT PROFILE DOWNSTREAM OF AN AERODYNAMIC BODY

(75) Inventor: Mark A. Reissig, Normandy Park, WA (US)

(73) Assignee: The Boeing Company, Chicago, IL (US)

( * ) Notice: Subject to any disclaimer, the term of this patent is extended or adjusted under 35 U.S.C. 154(b) by 170 days.

(21) Appl. No.: 12/723,678

(22) Filed: Mar. 14, 2010

(51) Int. Cl.
*B64C 21/04* (2006.01)
*B64C 21/06* (2006.01)

(52) U.S. Cl.
USPC ........................................ 244/208

(58) Field of Classification Search
USPC .................... 244/209, 208, 204, 200, 207
See application file for complete search history.

(56) References Cited

U.S. PATENT DOCUMENTS

| | | | | |
|---|---|---|---|---|
| 3,055,614 A | * | 9/1962 | Thompson | 244/208 |
| 3,149,804 A | * | 9/1964 | Litz, Jr. | 244/209 |
| 4,666,104 A | * | 5/1987 | Kelber | 244/209 |
| 4,917,336 A | | 4/1990 | Jacobs et al. | |
| 5,156,353 A | * | 10/1992 | Gliebe et al. | 244/130 |
| 6,004,095 A | | 12/1999 | Waitz et al. | |
| 6,027,305 A | | 2/2000 | Ng et al. | |

* cited by examiner

*Primary Examiner* — Tien Dinh
*Assistant Examiner* — Richard R Green
(74) *Attorney, Agent, or Firm* — Ameh IP; Elahe Tossi; Lowell Campbell

(57) ABSTRACT

A system and method for reducing a velocity deficit from an aerodynamic body is disclosed. An air jet is injected into an ejector mixing chamber in the aerodynamic body. The air jet creates a suction effect in the ejector mixing chamber, which suctions boundary layer air from a perforated surface in at least one side of the aerodynamic body into a plenum chamber and into the ejector mixing chamber. The air jet ejects the boundary layer air and the air jet from a trailing edge slot of the ejector mixing chamber. Suctioning the boundary layer air and ejecting the boundary layer air and the air jet from the trailing edge slot reduces a velocity deficit on a trailing edge of the aerodynamic body. The reduced velocity deficit and the suctioning of boundary layer air reduce noise, turbulence, blade stress, and blade deformation.

20 Claims, 7 Drawing Sheets

EJECTOR DRIVEN FLOW CONTROL FOR REDUCING VELOCITY DEFICIT PROFILE DOWNSTREAM OF AN AERODYNAMIC BODY

FIELD

Embodiments of the present disclosure relate generally to aerodynamics. More particularly, embodiments of the present disclosure relate to reducing noise due to airflow over an aerodynamic body.

BACKGROUND

Aircraft designs often use aerodynamic struts to mount devices on an aircraft. Airflows around the aerodynamic struts may have a velocity distortion caused by a slowing of boundary layer air around the aerodynamic strut. In particular, a velocity distortion may result from aerodynamic struts preceding an open-rotor fan propulsion system in an airflow. Interaction of blades of the open rotor fan propulsion system with the velocity distortion may create turbulence and result in a non-optimal noise level.

Existing solutions generally address the velocity distortion by blowing bleed air from an aircraft engine out of a trailing edge of the aerodynamic strut. A disadvantage of the existing solutions is a requirement for a significant amount of bleed air causing a significant increase in fuel consumption of the aircraft engine. In addition, the bleed air and resulting fuel consumption performance penalty may increase design complexity of the aircraft engine. Furthermore, the bleed air may be hot and the resulting thermal distortion may create additional noise when interacting with the open-rotor fan blades. The hot engine bleed air may also complicate design (e.g., thermal design) of the open-rotor fan blades, which may impose additional weight and performance penalties on the open-rotor fan propulsion system.

Therefore, there is a need for systems and methods for reducing velocity distortion caused by an aerodynamic strut preceding an open-rotor propulsion system in an airflow.

SUMMARY

A system and method for reducing a velocity deficit from an aerodynamic body is disclosed. An air jet is injected into an ejector mixing chamber in the aerodynamic body. The air jet creates a suction effect in the ejector mixing chamber, which suctions boundary layer air from a perforated surface in at least one side of the aerodynamic body into a plenum chamber and into the ejector mixing chamber. The air jet ejects the boundary layer air and the air jet out of a trailing edge slot of the ejector mixing chamber. Suctioning the boundary layer air and ejecting the boundary layer air and the air jet out of the trailing edge slot reduces a velocity deficit on a trailing edge of the aerodynamic body. The reduced velocity deficit and the suctioning of boundary layer air reduce noise, turbulence, blade stress, and blade deformation.

In a first embodiment, an apparatus reduces a velocity deficit of an airflow entering an open-rotor fan propulsion system. An aerodynamic strut structurally supports the open-rotor fan propulsion system, and the aerodynamic strut comprises one or more perforated surfaces. A plenum chamber within the aerodynamic strut draws external air into the plenum chamber. An ejector mixing chamber is coupled to the plenum chamber and a trailing edge slot in a trailing portion of the aerodynamic strut. At least one primary ejector nozzle injects pressurized air into the ejector mixing chamber such that the pressurized air draws air from the plenum chamber into the ejector mixing chamber and out of the trailing edge slot to obtain an ejected gas.

In a second embodiment, an ejector driven flow control system reduces a velocity deficit. An aerodynamic body comprises a trailing edge slot and a plenum chamber within the aerodynamic body. At least one perforated surface on a side of the aerodynamic body suctions boundary layer air into the plenum chamber, and an ejector mixing chamber is coupled to the plenum chamber. An air injection nozzle injects an air jet into the ejector mixing chamber and expels the boundary layer air and the air jet out of the trailing edge slot.

In a third embodiment, a method reduces trailing edge turbulence. An air jet is injected into an ejector mixing chamber in an aerodynamic body. Then, a suction effect is created in the ejector mixing chamber using the air jet. Boundary layer air is suctioned from perforated surfaces in at least one side of the aerodynamic body into a plenum chamber. The boundary layer air is suctioned from the plenum chamber into the ejector mixing chamber using the suction effect. The air jet and the boundary layer air are then ejected out of the trailing edge slot to obtain an ejected gas.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to aircraft control systems, fluid dynamic systems, high lift devices, and other functional aspects of the systems (and the individual operating components of the systems) may not be described in detail herein. In addition, those skilled in the art will appreciate that embodiments of the present disclosure may be practiced in conjunction with a variety of different aircraft control systems, electrical systems and aircraft wing configurations, and that the system described herein is merely one example embodiment of the disclosure.

Embodiments of the disclosure are described herein in the context of practical non-limiting applications, namely, an engine aerodynamic strut. Embodiments of the disclosure, however, are not limited to such engine aerodynamic strut applications, and the techniques described herein may also be utilized in other structural applications. For example, embodiments may be applicable to weapon mounts on fighter aircraft, forward mounted open rotors, azimuth thrusters for ships, submarine quieting, fans, and the like.

As would be apparent to one of ordinary skill in the art after reading this description, the following are examples and embodiments of the disclosure are not limited to operating in accordance with these examples. Other embodiments may be utilized and structural changes may be made without departing from the scope of the exemplary embodiments of the present disclosure.

Figure 1:
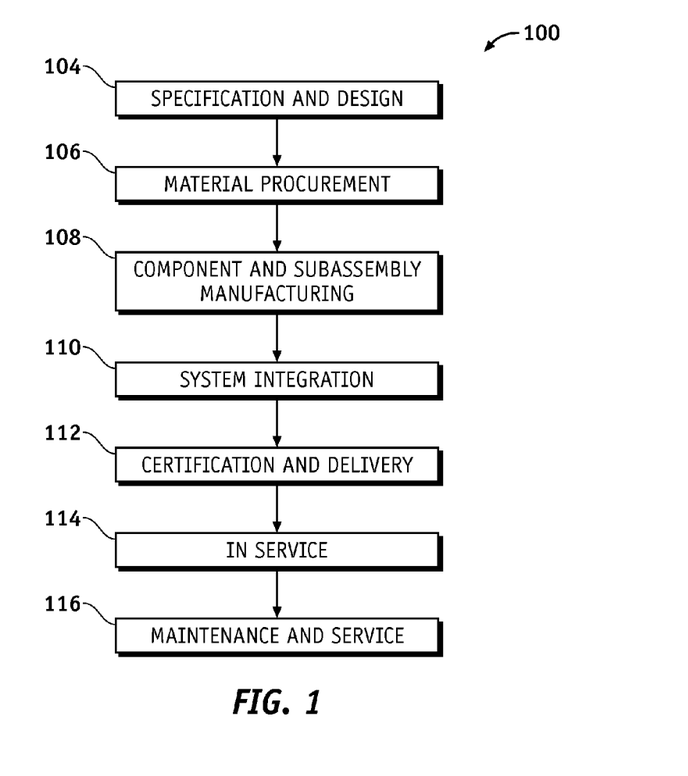
FIG. 1 is an illustration of a flow diagram of an exemplary aircraft production and service methodology.
Figure 2:
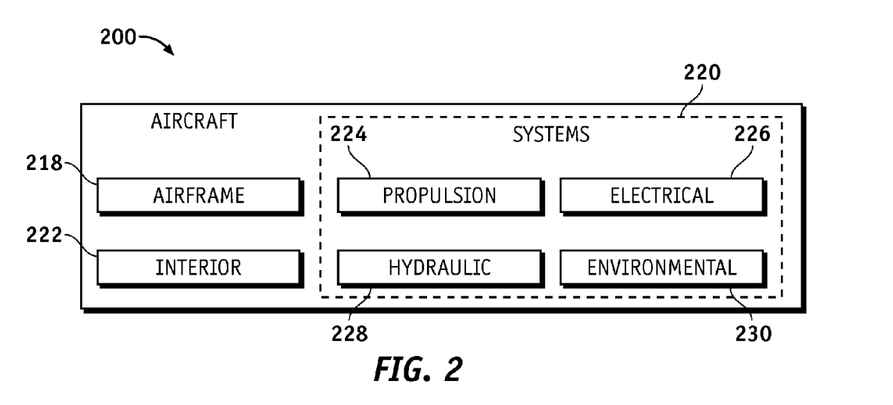
FIG. 2 is an illustration of an exemplary block diagram of an aircraft.

Referring more particularly to the drawings, embodiments of the disclosure may be described in the context of an aircraft manufacturing and service method 100 as shown in FIG. 1 and an aircraft 200 as shown in FIG. 2. During pre-production, the exemplary method 100 may include specification and design 104 of the aircraft 200 and material procurement 106. During production, component and subassembly manufacturing 108 and system integration 110 of the aircraft 200 takes place. Thereafter, the aircraft 200 may go through certification and delivery 112 in order to be placed in service 114. While in service by a customer, the aircraft 200 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be without limitation an airline, leasing company, military entity, service organization, and the like.

As shown in FIG. 2, the aircraft 200 produced by the exemplary method 100 may include an airframe 218 with a plurality of systems 220 and an interior 222. Examples of high-level systems 220 include one or more of a propulsion system 224, an electrical system 226, a hydraulic system 228, and an environmental system 230. Any number of other systems may also be included. Although an aerospace example is shown, the embodiments of the disclosure may be applied to other industries, such as without limitation, the automotive industry, and the like.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 200 is in service. Also, one or more apparatus embodiments, method embodiments, or a combination thereof may be utilized during the production stages 108 and 110, for example, by substantially expediting assembly of or reducing the cost of an aircraft 200. Similarly, one or more of apparatus embodiments, method embodiments, or a combination thereof may be utilized while the aircraft 200 is in service, for example and without limitation, to maintenance and service 116.

Figure 3:
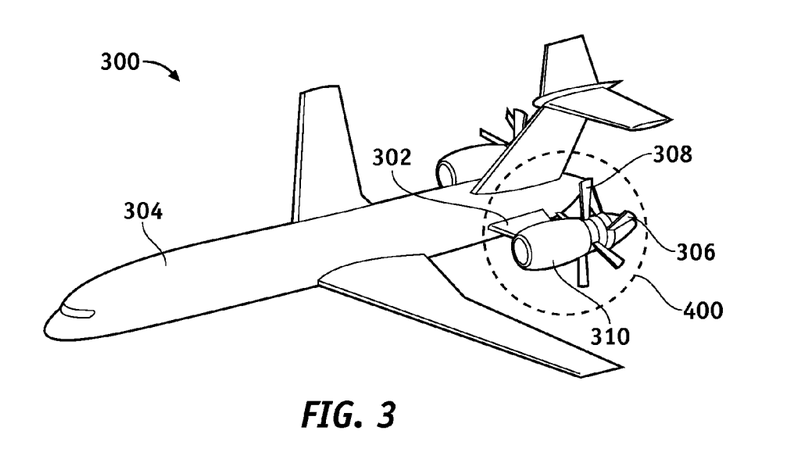
FIG. 3 is an illustration of a perspective view of an exemplary open-rotor fan propulsion system attached by an aerodynamic strut to an aircraft.

FIG. 3 is an illustration of a perspective view of an exemplary open-rotor fan propulsion system 300 attached by an aerodynamic strut 302 to an aircraft fuselage 304. The open-rotor fan propulsion system 300 may comprise an engine 310 driving tail-mounted contra-rotating pusher open-rotor fans 306 and 308 to power the aircraft fuselage 304. The aerodynamic strut 302 is an aerodynamic fairing, which extends between the engine 310 and the aircraft fuselage 304, and surrounds a structure (not shown) which supports the engine 310. The aerodynamic strut 302 also comprises other apparatuses (not shown) such as linkages, fuel and electrical lines coupled to the engine 310.

Figure 4:
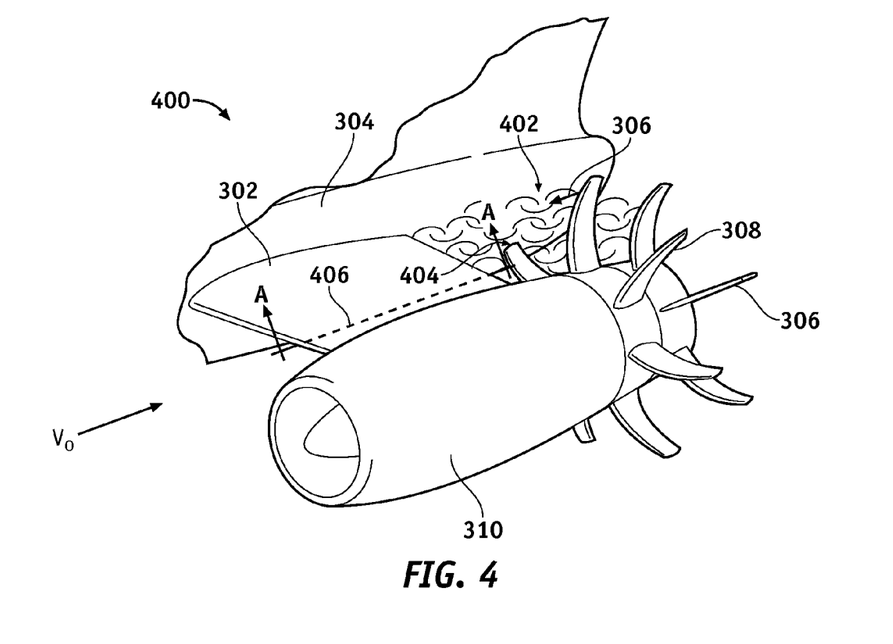
FIG. 4 is an illustration of an expanded perspective view of the exemplary open-rotor fan propulsion system attached by the aerodynamic strut to the aircraft in FIG. 3.

FIG. 4 is an illustration of an expanded perspective view of an exemplary open-rotor fan propulsion system 400 shown in FIG. 3 attached by the aerodynamic strut 302 to the aircraft fuselage 304. The aerodynamic strut 302 creates a velocity distortion 402 during flight. The velocity distortion 402 can have undesirable side effects.

A first undesirable side effect occurs when a blade 404 of the open-rotor fans 306/308 passes through the velocity distortion 402; the blade 404 can chop the velocity distortion 402 producing noise. For example, if each open-rotor fan 306/308 has 12 blades such as blade 404 and rotates at 20 revolutions per second, then 240 chops per second occur, which may produce 240 Hz noise and accompanying harmonics.

A second undesirable side effect can occur because a lift produced by the blade 404 is generally a function of an angle of attack (not shown) of the blade 404 with respect to incoming air. The blade 404 entering the velocity distortion 402 changes the angle of attack of the blade 404. The angle of attack experienced by the blade 404 is a vector sum of a freestream vector $V_o$, resulting from the forward speed of the aircraft and a vector "rotation" representing a rotational velocity (not shown) of the blade 404. When the blade 404 enters the velocity distortion 402, the freestream vector $V_0$ is reduced, and the vector sum causes a higher angle of attack to occur. The higher angle of attack creates a local increase in turbulence of the resulting wake of the blade 404, which results in increased noise.

A third undesirable effect resulting from the increased angle of attack is that the blade 404 may become more highly loaded, and a lift load in a direction of thrust becomes greater, thereby causing the blade 404 to flex. Even a small percentage increase in thrust during passage through the velocity distortion 402, such as but without limitation, a ten percent increase, can cause significant stresses on blades such as the blade 404 of the open-rotor fans 306/308 and potential deformation to the blades 404 over a period of time. For example, if the velocity distortion 402 provides a ten percent increase in lift when the blade 404 passes through the velocity distortion 402, the blade 404 can experience an impulse of ten percent of the thrust load. Further, at 20 revolutions per second, each blade 404 of the open-rotor fans 306/308 passes through the velocity distortion 402 once every ½0 second, or every 50 milliseconds. As a result, a significant cyclic load may be applied to the blade 404 every 50 milliseconds, which may result in significant stresses and potential deformation to the blade 404 of the open-rotor fans 306/308. Thus, such a cyclic loading should be avoided.

Figure 5:
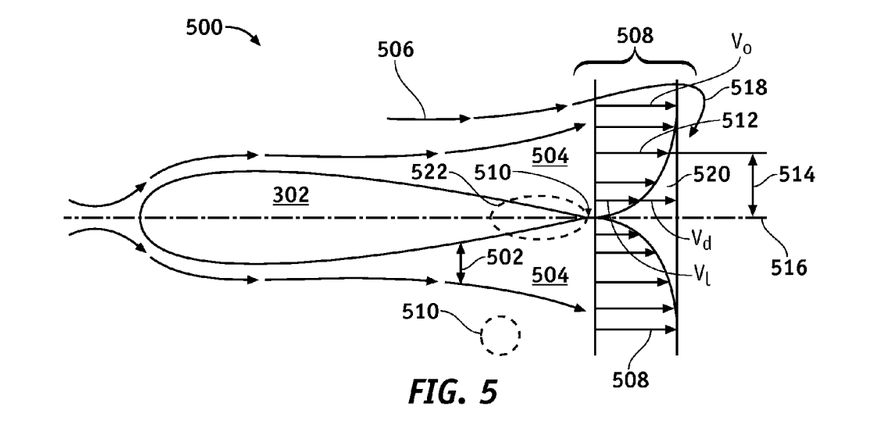
FIG. 5 is an illustration of an exemplary downstream velocity profile of the aerodynamic strut of the aircraft in FIG. 3.

FIG. 5 is an illustration of an exemplary downstream velocity profile 500 of the aerodynamic strut 302 of the aircraft fuselage 304 in FIG. 3. One reason the aerodynamic strut 302 sheds the velocity distortion 402 during flight is that a thickness 502 of a boundary layer air 504 progressively increases in a downstream direction 506, causing a downstream velocity profile 508 to exist at a trailing edge 510. The downstream velocity profile 508 illustrates a variation in velocity of air as a function of a distance 514 from an aerodynamic strut centerline 516 of the aerodynamic strut 302. For example, a velocity vector 512 represents an air velocity at the distance 514 from the aerodynamic strut centerline 516. The downstream velocity profile 508 at the trailing edge 510 produces a "velocity deficit" $V_d$, in the velocity distortion 402 (FIG. 4). In this example, the velocity deficit $V_d$ is a difference in velocity between the freestream velocity $V_o$ (outside the velocity distortion 402), and a local velocity $V_L$. A velocity deficit region 520 has an accompanying reduction in mass flow, and consequently air such as that indicated by path 518 tends to be entrained into the velocity deficit region 520 causing turbulence.

Figure 6:
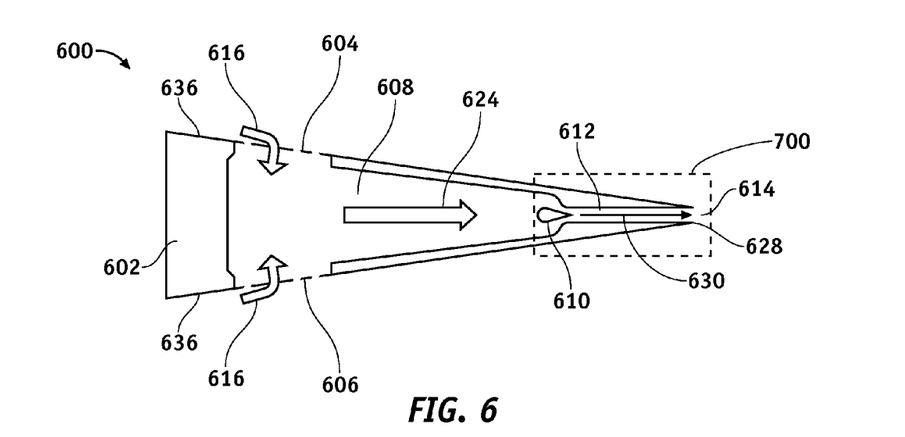
FIG. 6 is an illustration of an exemplary ejector driven flow control system according to an embodiment of the disclosure.

FIG. 6 is an illustration of an exemplary ejector driven flow control system 600 according to an embodiment of the disclosure. The exemplary ejector driven flow control system 600 comprises an aerodynamic strut 602, a top perforated surface 604, a bottom perforated surface 606, a plenum chamber 608, a primary ejector nozzle 610, an ejector mixing chamber 612, and a trailing edge slot 614. The primary ejector nozzle 610 injects pressurized air 618 (FIG. 7) into the ejector mixing chamber 612 creating suction in the plenum chamber 608 due to an induction effect (momentum exchange) with the air jet 630. Suction from the plenum chamber 608 draws the external air 616 through the top and bottom perforated surfaces 604/606 into the plenum chamber 608. The plenum chamber air 624 from the plenum chamber 608 is drawn via the induction effect into the ejector mixing chamber 612 and blown through the trailing edge slot 614.

The top perforated surface 604 and the bottom perforated surface 606 may comprise, for example but without limitation, holes, slots, a porous material, and the like. The top perforated surface 604 and the bottom perforated surface 606 may be made from material comprising, for example but without limitation, steel, aluminum, plastic, a composite material, and the like. The top and bottom perforated surfaces 604/606 draw the external air 616 from the boundary layer air 504 (FIG. 5) of the aerodynamic strut 302/602. Drawing the external air 616 from the boundary layer air 504 decreases a thickness of the boundary layer air 504 around the aerodynamic strut 302/602. Since part of a low velocity air of the boundary layer air 504 is removed by suction on a surface 636 (sometimes referred to as suction bleed) via, for example, perforated surfaces 604/606, the resulting velocity profile is more optimal than velocity profiles of existing solutions.

The plenum chamber 608 comprises a chamber within the aerodynamic strut 602. A shape of the plenum chamber 608 may be chosen to, for example but without limitation, improve suction, reduce noise, and the like. For example but without limitation, the shape of the plenum chamber 608 may be, a venturi shape, any shape complimentary to the outer mold line of the aerodynamic strut 302/602 having a cross sectional area significantly larger than a cross area of the ejector mixing chamber 612, and the like. The plenum chamber 608 may comprise, for example but without limitation, acoustic suppression materials, acoustic suppression surfaces, acoustic suppression devices, and the like.

The primary ejector nozzle 610 may comprise, for example but without limitation, a long slotted nozzle, a plurality of small nozzles (with, for example but without limitation, about 0.01 inches to about 0.075 inches diameter), and the like. The primary ejector nozzle 610 may be made of material comprising, for example but without limitation, steel, plastic, aluminum, composite, and the like. The primary ejector nozzle 610 receives the pressurized air 618 via, for example but without limitation, a channel (not shown), a hose (not shown), and the like from a source (not shown) of the pressurized air 618. The source may comprise, for example but without limitation, bleed air from the engine 310, a compressor powered by electric power from the engine 310, a compressor powered by a dedicated motor, a separate fan, and the like. The pressurized air 618 may have a pressure of, for example but without limitation, about 15 psi to about 100 psi above the atmospheric pressure, and the like. The primary ejector nozzle 610 creates an air jet 630 (FIG. 7) in the ejector mixing chamber 612.

The ejector mixing chamber 612 uses the air jet 630 from the primary ejector nozzle 610 to increases the volume of the air jet 630. The high velocity air of the air jet 630 mixes and exchanges momentum with the plenum chamber air 624 from the plenum chamber 608, and blows a combined air out of the trailing edge slot 614, thereby creating a large volume jet of air. Thus, the amount of bleed air required from the engine 310 is reduced by, for example but without limitation, at least about 75% compared to existing solutions that may use substantially only bleed air. Furthermore, the ejector mixing chamber 612 cools the air blown out of the trailing edge slot 614 by the mixing action of the air jet 630. The cooling reduces thermal distortions that may increase noise. The cooled air from ejector mixing chamber 612 is in contrast to existing solution where hot bleed air may require cooling and requisite additional energy and performance penalties.

The trailing edge slot 614 is located in a trailing portion 522 (FIG. 5) of the aerodynamic strut 302. The trailing edge slot 614 merges the air blown out of the trailing edge slot 614 with the boundary layer air 504 using the ejector mixing chamber 612. The trailing edge slot 614 may comprise, for example but without limitation, a straight edge, a chevron edge, a nozzle, and the like. The trailing edge slot 614 may be made of material comprising, for example but without limitation, steel, aluminum, titanium, composite materials, and the like.

In this manner, the downstream velocity profile 508 is improved by two simultaneous and complementary effects. First, the external air 616 drawn through the perforated surfaces 604/606 removes air from the boundary layer air 504 improving laminar flow and a trailing edge velocity profile as discussed in more detail in the context of discussion of FIG. 10 below. Second, the air from the plenum chamber 608 and the air jet 630 blown through the trailing edge slot 614 further improves the trailing edge velocity profile as discussed in more detail in the context of discussion of FIG. 11 below. Further, the exemplary ejector driven flow control system 600 also decreases the noise that may be generated from the interaction of aerodynamic struts 602 downstream velocity profile 508 with the open-rotor fans 306/308 in the open-rotor fan propulsion system 400. In this manner, the exemplary ejector driven flow control system 600 reduces the noise with minimal impact to the propulsion system efficiency, by using the air from the plenum chamber 608 and the air jet 630 blown out of the trailing edge slot 614 that also provides suctioning of the boundary layer air 504. The reduction in noise is discussed in more detail in the context of discussion of FIG. 12 below.

Figure 7:
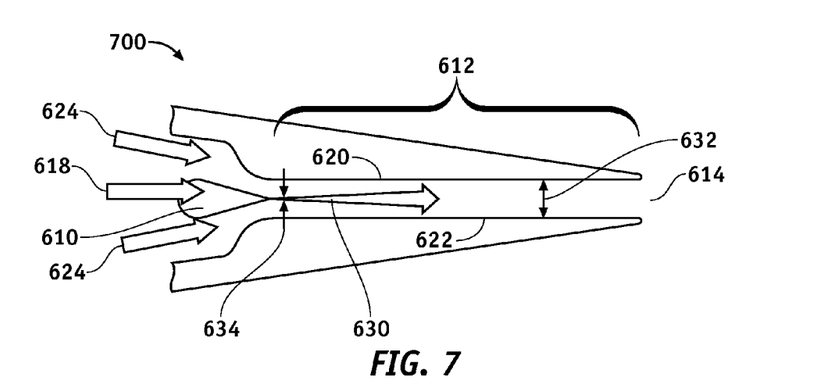
FIG. 7 is an illustration of an expanded perspective view of a portion of the exemplary ejector driven flow control system shown in FIG. 6 according to an embodiment of the disclosure.

FIG. 7 is an illustration of an expanded perspective view of a portion of the exemplary ejector driven flow control system 600 showing an exemplary ejector system 700 according to an embodiment of the disclosure. The exemplary ejector system 700 may comprise the trailing edge slot 614 comprising a top surface 620, a bottom surface 622, and an ejector mixing chamber 612. The top surface 620 and the bottom surface 622 may comprise an acoustic dampening surface comprising an acoustic noise suppression material, such as but without limitation, an acoustic foam, and the like.

Suction created by the primary ejector nozzle 610 is used to both draw the external air 616 off the boundary layer air 504 of an aerodynamic strut such as the aerodynamic strut 602 and then inject the drawn external air 616 through the trailing edge slot 614 via the ejector mixing chamber 612. In this manner, the drawn external air 616 enters the plenum chamber 608 to form the plenum chamber air 624.

The plenum chamber air 624 enters the ejector mixing chamber 612, and the pressurized air 618 from, for example but without limitation, the engine 310, also enters the ejector mixing chamber 612 via the primary ejector nozzle 610 to create the suction effect as explained above. The pressurized air 618 is cooled by mixing with the plenum chamber air 624 to obtain mixed air. The mixed air in the ejector mixing chamber 612 is then ejected through the trailing edge slot 614 of the ejector mixing chamber 700 to compensate for the velocity distortion $V_d$ downstream of the aerodynamic strut 302. A width 632 of the ejector mixing chamber 612 may be, for example but without limitation, about 0.1 to 0.75, depending on a design and a distance to the blade 404, and the like. A width 634 of the air jet 630 may be, for example but without limitation, about 0.01 inches to about 0.075 inches, and the like.

Figure 8:
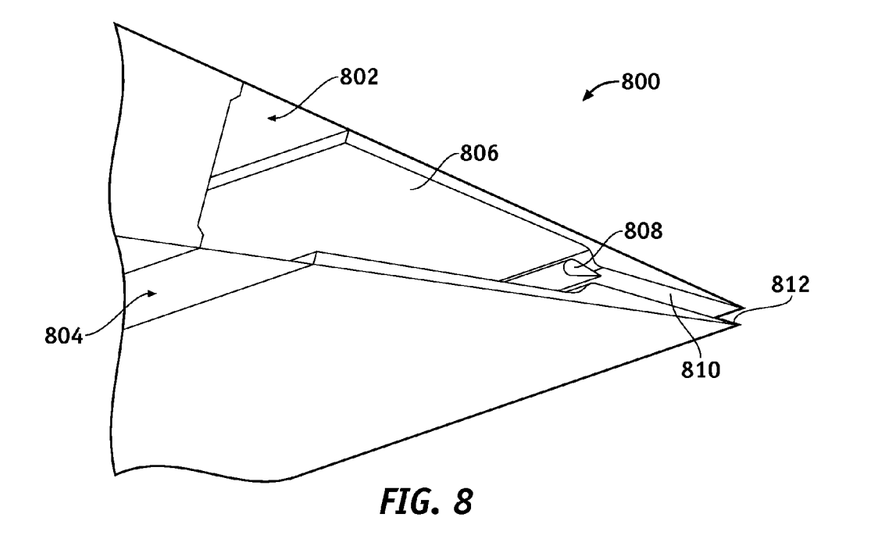
FIG. 8 is an illustration of a cross sectional view of an exemplary ejector driven flow control system according to an embodiment of the disclosure.

FIG. 8 is an illustration of a cross sectional view of an exemplary ejector driven flow control system 800 taken along section A-A 406 of FIG. 4 according to an embodiment of the disclosure. The exemplary ejector driven flow control system 800 comprises a top perforated surface 802 (604 in FIG. 6), a bottom perforated surface 804 (606 in FIG. 6), a plenum chamber 806 (608 in FIG. 6), an primary ejector nozzle 808 (610 in FIG. 8), an ejector mixing chamber 810 (608 in FIG. 6), and a trailing edge slot 812 (614 in FIG. 6).

Figure 9:
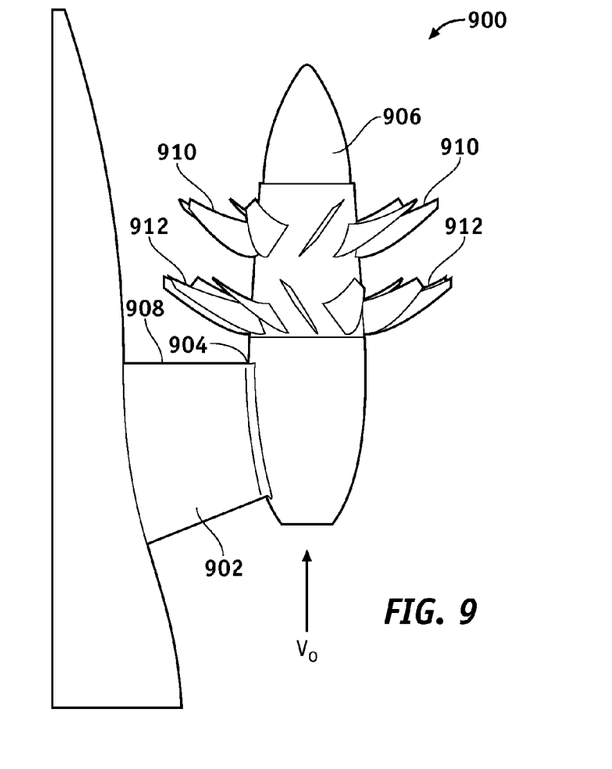
FIG. 9 is an illustration of an aerodynamic structure showing a placement of an exemplary ejector driven flow control system on an aerodynamic strut according to an embodiment of the disclosure.

FIG. 9 is an illustration of an aerodynamic structure 900 showing a placement of the exemplary ejector driven flow control system 600 (FIG. 6) on an aerodynamic strut 902 according to an embodiment of the disclosure. The exemplary ejector driven flow control system 600 may extend from a side 904 of the engine 906 to a position 908 on the aerodynamic strut 902 suitable for adequately compensating for the velocity deficit $V_d$ downstream of the aerodynamic strut 904 thereby reducing the turbulent flow into the open-rotor fans 910/912.

Figure 10:
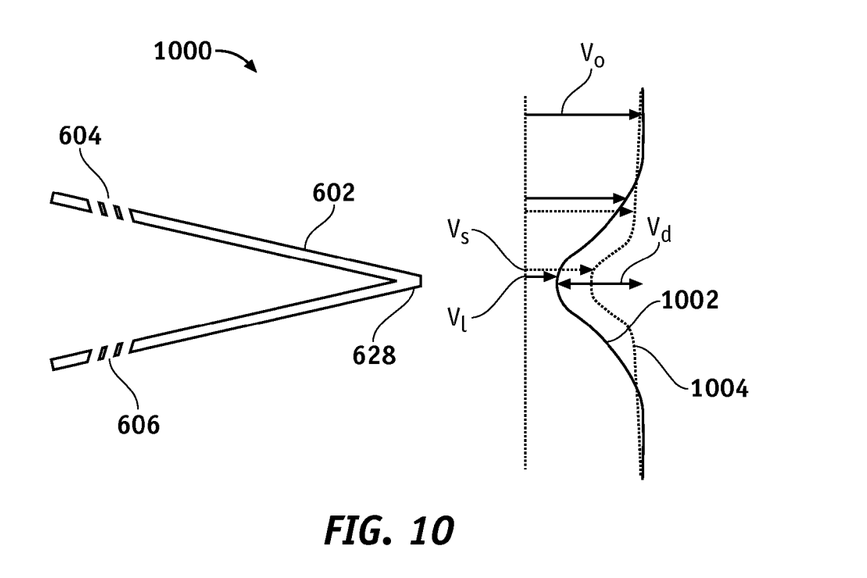
FIG. 10 is an illustration of an improvement to velocity profile downstream of a trailing edge due to suction according to an embodiment of the disclosure.
Figure 11:
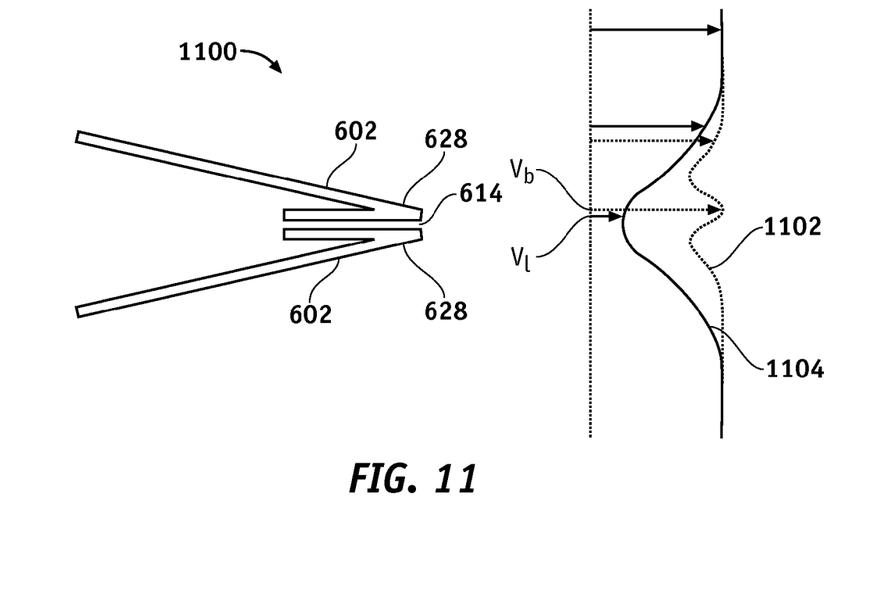
FIG. 11 is an illustration of an improvement to velocity profile downstream of a trailing edge due to blowing according to an embodiment of the disclosure.

FIGS. 10-11 show two simultaneous and complementary effects 1000 and 1100 which improve the downstream velocity profile 1002 (508 in FIG. 5). FIG. 10 is an illustration of an improvement to the downstream velocity profile 1002 downstream of the trailing edge 602 due to suction according to an embodiment of the disclosure. FIG. 11 is an illustration of an improvement to the downstream velocity profile 1002 downstream of trailing edge 602 due to blowing according to an embodiment of the disclosure.

As explained above, the velocity profile at the aerodynamic strut 602 trailing edge 628 (FIG. 6, 510 in FIG. 5) produces a velocity deficit $V_d$ in the velocity distortion 402 (FIG. 4), which is a difference in velocity between the freestream velocity $V_o$, and the local velocity $V_L$. As shown in FIG. 10, the air from the boundary layer air 504 is removed by suction on the surface via the perforated surface 604/606, which increases the local velocity form $V_L$ to $V_s$ reducing velocity deficit $V_d$. In this manner, an improved velocity profile 1004 is obtained which reduces the turbulent flow downstream of the aerodynamic strut 302 and thereby into the open-rotor fans 910/912.

With trailing edge slot 1104 blowing implemented without the suction on the surface, the local velocity increases from $V_s$ to $V_b$, as shown in FIG. 11, thereby reducing the velocity deficit $V_d$. In this manner, an improved velocity profile 1102 is obtained which reduces the turbulent flow downstream of the aerodynamic strut 302 and thereby into the open-rotor fans 910/912. The exemplary ejector driven flow control system 600 employs both effects discussed above in FIGS. 10-11 in a complementary fashion as illustrated in FIG. 12.

Figure 12:
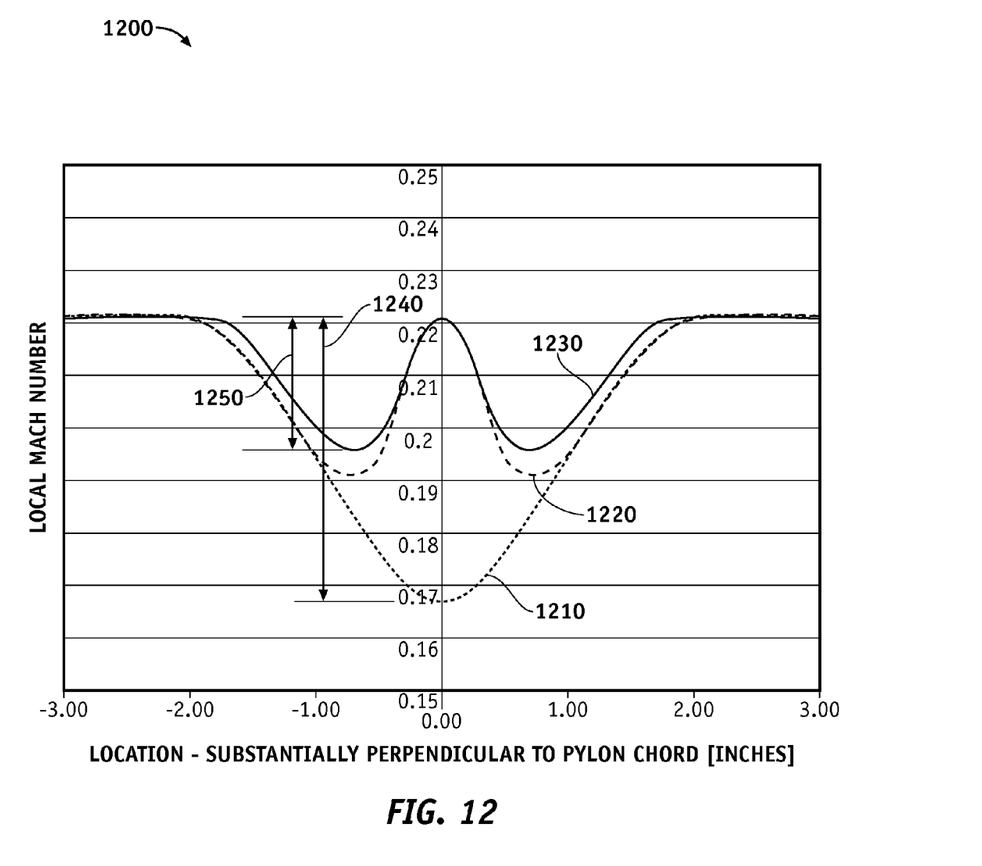
FIG. 12 is an illustration of an exemplary downstream velocity profile of an ejector driven flow control system according to an embodiment of the disclosure compared to conventional methods.

FIG. 12 is an illustration of an exemplary downstream velocity profile of the exemplary ejector driven flow control system 600 (FIG. 6) according to an embodiment of the disclosure compared to conventional methods. FIG. 12 shows the downstream velocity profile at locations substantially perpendicular to a chord of aerodynamic strut 302 vs. local Mach number. A computational fluid dynamics (CFD) simulation was performed on a configuration of the exemplary ejector driven flow control system 600 of the open-rotor fan propulsion system 300 of FIG. 3. FIG. 12 compares the results of using 1) no trailing edge blowing system on curve 1210, 2) a conventional plain trailing edge blowing system on curve 1220, and 3) the exemplary ejector driven flow control system 600 on curve 1230. The exemplary ejector driven flow control system 600 has the best performance as shown on the curve 1230 compared to the curve 1210 and 1220. The exemplary ejector driven flow control system 600 uses at least about 75% less high pressure air such as the engine air than the conventional plain trailing edge blowing system. As shown in FIG. 12, the magnitude of the velocity difference is reduced from a magnitude 1240 when using no trailing edge blowing system (curve 1210) to a magnitude 1250 when using the exemplary ejector driven flow control system 600 (curve 1230).

Thus, the three undesirable side effects discussed in the context of discussion of FIG. 4 are reduced or eliminated. As explained above, the first undesirable side effect can occur when the blade 404 of the open-rotor fans 306/308 passes through the velocity distortion 402. Since the embodiments reduce or eliminate the velocity distortion 402, noise from the open-rotor fans 306/308 chopping the velocity distortion 402 is reduced or eliminated. The second undesirable side effect can occur because of an increase in an angle of attack of the blade 404 of the open-rotor fans 306/308 with respect to the incoming air. Since the embodiments reduce or eliminate the velocity distortion 402, the increase in the angle of attack of the blade 404 of the open-rotor fans 306/308 and resulting noise are reduced or eliminated. The third undesirable effect can result from a lift load on the blades of the open-rotor fans 306/308 changing as the blades passes through the velocity distortion 402. Since embodiments reduce or eliminate the velocity distortion 402, changes in the lift load and resulting significant stresses and potential deformation to the blade 404 of the open-rotor fans 306/308 are reduced or eliminated. In this manner, the exemplary ejector driven flow control system 600 reduces blade stresses, blade deformation, and interaction noise from interaction between the aerodynamic strut 302 and blade 404 of the open-rotor fans 306/308.

Figure 13:
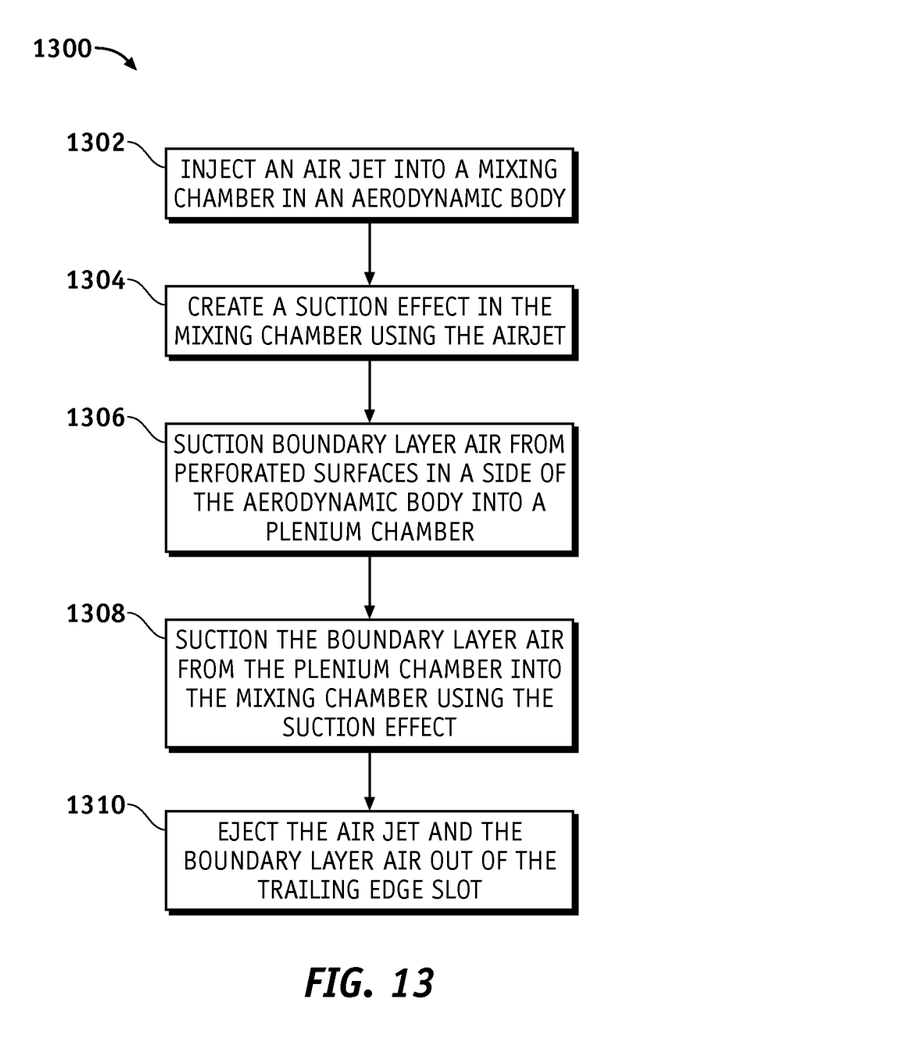
FIG. 13 is an illustration of an exemplary flow chart for operation of an ejector driven flow control system according to an embodiment of the disclosure.

FIG. 13 is an illustration of an exemplary process 1300 for operation of the exemplary ejector driven flow control system 600 according to an embodiment of the disclosure. Various tasks performed in connection with process 1300 may be performed by software, hardware, firmware, or any combination thereof. For illustrative purposes, the following description of process 1300 may refer to elements mentioned above in connection with FIGS. 1-11. In practical embodiments, portions of process 1300 may be performed by different elements of the exemplary ejector driven flow control system 600 such as the perforated surfaces 604/606, plenum chamber 608, the primary ejector nozzle 610, the ejector mixing chamber 612, and the trailing edge slot 614. Process 1300 may have functions, material, and structures that are similar to the embodiments shown in FIGS. 1-11. Therefore common features, functions, and elements may not be redundantly described here.

Process 1300 uses the exemplary ejector driven flow control system 600 mounted in the aerodynamic strut 602 to 1) draw low energy air off the boundary layer air 504, and 2) blow high energy air out of the trailing edge slot 614. Either of these features alone reduces the flow distortion such as the velocity distortion $V_d$ downstream, in this manner the process 1300 provides both (1) and (2) in a complementary fashion. In addition, (1) and (2) are accomplished with a lower performance penalty to the engine 310 than existing solutions. The lower performance penalty results because, as explained above, an amount of airflow from the engine 310 introduced to the exemplary ejector driven flow control system 600 is at least about 75% less than an amount of an airflow from the engine 310 used by the conventional plain trailing edge blowing system.

Process 1300 may begin by injecting an air jet into the ejector mixing chamber 612 of the aerodynamic strut 602 to obtain an injected air jet (task 1302).

Process 1300 may then continue by creating a suction effect in the ejector mixing chamber 612 using the injected air jet (task 1304).

Process 1300 may then continue by suctioning boundary layer air 504 from perforated surfaces 604/606 in a side of the aerodynamic strut 602 into the plenum chamber 608 using the suction effect (task 1306). In this manner, the velocity deficit $V_d$ is reduced or eliminated by reducing or eliminating turbulent flow over the aerodynamic strut 602, thereby reducing or eliminating noise.

Process 1300 may continue by suctioning the boundary layer air 504 from the plenum chamber 608 into the ejector mixing chamber 612 using the suction effect (task 1308). In a suction state where the boundary layer air 504 is suctioned, the velocity deficit $V_d$ downstream of the aerodynamic strut 602 is reduced or eliminated. Reducing or eliminating the velocity deficit $V_d$ in the suction state reduces or eliminates turbulent flow over the aerodynamic strut 602 compared to a no-suction state where the boundary layer air 504 is not suctioned. Thereby, noise in the suction state is reduced or eliminated compared to the non-suction state.

Process 1300 may continue by ejecting the air jet and the boundary layer air 504 from the trailing edge slot 614 to obtain an ejected gas (task 1310). In a flow state where the ejected gas flows out of the trailing edge slot 614 the velocity deficit $V_d$ downstream of the aerodynamic strut 602 is reduced compared to a no-flow state wherein the ejected gas does not flow out of the trailing edge slot 614. Reducing the velocity deficit $V_d$ in the flow state reduces the stress and the deformation of the open-rotor fan blade 404 compared to the no-flow state wherein the velocity deficit profile is not reduced.

In this way, according to various embodiments of the disclosure, the velocity distortion downstream of the aerodynamic strut such as behind an aerodynamic strut is reduced with minimum performance and design costs to the aircraft. For the open-rotor fan propulsion system 300 in a pusher configuration, this results in lower noise.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 9-16 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. An apparatus for reduction of a velocity deficit of an airflow entering an open-rotor fan propulsion system, the apparatus comprising:
    an aerodynamic strut operable to structurally support the open-rotor fan propulsion system the aerodynamic strut comprising one or more perforated surfaces;
    a plenum chamber comprising a venturi shape within the aerodynamic strut operable to draw external air into the plenum chamber from the one or more perforated surfaces;
    an ejector mixing chamber comprising a constant width and coupled to the plenum chamber and a trailing edge slot in a trailing portion of the aerodynamic strut; and
    at least one primary ejector nozzle located aft of the plenum chamber and comprising a plurality of small nozzles each operable to: receive compressed air only from a compressor and to inject an air jet of pressurized air consisting only of air into the ejector mixing chamber such that suction caused by the air jet draws the external air into the plenum chamber to provide a plenum chamber air and draws the plenum chamber air from the plenum chamber into the ejector mixing chamber and out of the trailing edge slot to create an ejected large volume jet of cool air comprising an increased volume jet of air of the air jet and the external air cooled only by mixing action of the air jet, the increased volume jet of air continually generated in the elector mixing chamber by mixing and exchanging momentum of high velocity air of the air jet with the plenum chamber air.

2. The apparatus according to claim 1, wherein the plenum chamber is located between the one or more perforated surfaces and the ejector mixing chamber.

3. The apparatus according to claim 1, wherein the external air is suctioned from a boundary layer air of the aerodynamic strut.

4. The apparatus according to claim 1, wherein the trailing edge slot comprises an acoustic dampening surface.

5. The apparatus according to claim 1, wherein a surface of the plenum chamber comprises an acoustic suppression material.

6. The apparatus according to claim 1, wherein a velocity deficit downstream of the aerodynamic strut is reduced in a flow state compared to a no-flow state, wherein the ejected large volume jet flows out of the trailing edge slot in the flow state and the ejected large volume jet does not flow out of the trailing edge slot in the no-flow state.

7. The apparatus according to claim 6, wherein a noise due to turbulence downstream of the aerodynamic strut is reduced in the flow state compared to the no-flow state thereby reducing noise over and around the aerodynamic strut.

8. The apparatus according to claim 6, wherein a stress and a deformation of an open-rotor fan blade are reduced in the flow state compared to the no-flow state.

9. The apparatus according to claim 1, wherein the small nozzles each comprise about 0.01 inches to 0.03 inches diameter.

10. An ejector driven flow control system for reducing velocity deficit, the system comprising:
    an aerodynamic body comprising a trailing edge slot and a plenum chamber comprising a venturi shape within the aerodynamic body;
    at least one perforated surface on a side of the aerodynamic body, the at least one perforated surface operable to suction boundary layer air into the plenum chamber;
    an ejector mixing chamber comprising a constant width and coupled to the plenum chamber; and
    an air injection nozzle located aft of the plenum chamber and comprising a plurality of small nozzles each operable to: receive only air from a compressor and inject an air jet consisting only of air into the ejector mixing chamber such that suction caused by the air jet draws the boundary layer air into the plenum chamber to provide a plenum chamber air, draws the plenum chamber air from the plenum chamber into the ejector mixing chamber, and expels a combination of the boundary layer air and the air jet comprising an increased volume jet of air out of the trailing edge slot to create an ejected large volume jet of cool air cooled only by mixing action of the air jet, the increased volume jet of air continually generated in the ejector mixing chamber by mixing and exchanging momentum of high velocity air of the air jet with the plenum chamber air.

11. The system according to claim 10, wherein the small nozzles each comprise about 0.01 inches to 0.03 inches diameter.

12. A method for reducing trailing edge turbulence, the method comprising:
    injecting an air jet consisting only of air from at least one small nozzle operable to receive air only from a compressor into an ejector mixing chamber in an aerodynamic body, the ejector mixing chamber comprising a constant width;
    creating a suction effect in the ejector mixing chamber using the air jet;
    suctioning boundary layer air from perforated surfaces in at least one side of the aerodynamic body into a plenum chamber comprising a venturi shape using the suction effect caused by the air jet, the plenum chamber located forward of the at least one small nozzle;
    using the suction effect caused by the air jet to draw the boundary layer air from the plenum chamber into the ejector mixing chamber and out of a trailing edge slot in the aerodynamic body;
    continually generating an increased volume jet of air in the ejector mixing chamber by mixing and exchanging momentum of high velocity air of the air jet with the boundary layer air from the plenum chamber to provide a mixing action of the air jet, and
    ejecting the increased volume jet of air comprising the air jet and the boundary layer air out of the trailing edge slot to create an ejected large volume jet of cool air cooled only by the mixing action of the air jet.

13. The method according to claim 12, further comprising reducing turbulent flow over the aerodynamic body in a suction state compared to a no-suction state, wherein the boundary layer air is suctioned from the perforated surfaces in the at least one side of the aerodynamic body in the suction state and the boundary layer air is not suctioned in the no-suction state.

14. The method according to claim 13, further comprising reducing a velocity deficit in the suction state compared to the no-suction state.

15. The method according to claim 12, further comprising dampening noise via an acoustic dampening surface located on the trailing edge slot.

16. The method according to claim 12, further comprising reducing a velocity deficit downstream of the aerodynamic body in a flow state compared to a no-flow state, wherein the ejected large volume jet flows out of the trailing edge slot in the flow state and the ejected large volume jet does not flow out of the trailing edge slot in the no-flow state.

17. The method according to claim 16, further comprising reducing turbulence downstream of the aerodynamic body in the flow state compared to the no-flow state.

18. The method according to claim 16, wherein noise due to turbulence downstream of the aerodynamic body is reduced in the flow state compared to the no-flow state thereby reducing noise over and around the aerodynamic body.

19. The method according to claim 16, wherein a stress and a deformation of an open-rotor fan blade are reduced in the flow state compared to the no-flow state.

20. The method of claim 12, wherein the at least one small nozzle comprises about 0.01 inches to 0.03 inches diameter.

* * * * *